(12) United States Patent
Ng et al.

(10) Patent No.: US 11,860,797 B2
(45) Date of Patent: Jan. 2, 2024

(54) PERIPHERAL DEVICE PROTOCOLS IN CONFIDENTIAL COMPUTE ARCHITECTURES

(71) Applicants: ADVANCED MICRO DEVICES, INC., Santa Clara, CA (US); ATI TECHNOLOGIES ULC, Markham (CA)

(72) Inventors: Philip Ng, Markham (CA); Nippon Raval, Markham (CA); David A. Kaplan, Austin, TX (US); Donald P. Matthews, Jr., Austin, TX (US)

(73) Assignees: ADVANCED MICRO DEVICES, INC., Santa Clara, CA (US); ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 17/565,666

(22) Filed: Dec. 30, 2021

(65) Prior Publication Data

US 2023/0229603 A1    Jul. 20, 2023

(51) Int. Cl.
  *G06F 13/10*    (2006.01)
  *G06F 12/084*    (2016.01)
  *G06F 12/1081*    (2016.01)

(52) U.S. Cl.
  CPC .......... *G06F 13/102* (2013.01); *G06F 12/084* (2013.01); *G06F 12/1081* (2013.01); *G06F 2212/603* (2013.01)

(58) Field of Classification Search
  CPC ................ G06F 13/102; G06F 12/084; G06F 2212/603; G06F 12/1081
  USPC ............................................................ 710/4
  See application file for complete search history.

(56) References Cited

U.S. PATENT DOCUMENTS

| | | | | |
|---|---|---|---|---|
| 11,556,482 | B1* | 1/2023 | Hunt | G06F 12/1408 |
| 2015/0248357 | A1* | 9/2015 | Kaplan | G06F 12/1036 |
| | | | | 713/193 |
| 2018/0107608 | A1* | 4/2018 | Kaplan | G06F 12/1466 |
| 2020/0322287 | A1 | 10/2020 | Connor et al. | |
| 2020/0327084 | A1 | 10/2020 | Choudhary et al. | |
| 2021/0026543 | A1* | 1/2021 | Trikalinou | G06F 3/0655 |
| 2021/0318980 | A1 | 10/2021 | Pal et al. | |
| 2022/0269433 | A1* | 8/2022 | Pal | G06F 3/0655 |
| 2022/0335109 | A1* | 10/2022 | Sahita | G06F 21/121 |

OTHER PUBLICATIONS

International Search Report and Written Opinion, PCT/US2022/053305, dated Apr. 21, 2023, 9 pages.

* cited by examiner

*Primary Examiner* — Christopher B Shin (57) ABSTRACT

Restricting peripheral device protocols in confidential compute architectures, the method including: receiving a first address translation request from a peripheral device supporting a first protocol, wherein the first protocol supports cache coherency between the peripheral device and a processor cache; determining that a confidential compute architecture is enabled; and providing, in response to the first address translation request, a response including an indication to the peripheral device to not use the first protocol.

20 Claims, 5 Drawing Sheets

FIG. 5 ial Compute Architectures

PERIPHERAL DEVICE PROTOCOLS IN CONFIDENTIAL COMPUTE ARCHITECTURES

BACKGROUND

Peripheral device protocols or standards such as Compute Express Link (CXL) allow for cache coherency between the peripheral device and a processor cache. To do so, the peripheral device issues transaction requests directed to system physical addresses of memory. Where the system implements a confidential compute architecture that restricts access to particular portions of memory to assigned entities, memory accesses by the peripheral device using system physical addresses are unable to be processed.

DETAILED DESCRIPTION

Peripheral device protocols or standards such as Compute Express Link (CXL) allow for cache coherency between the peripheral device and a processor cache. To do so, the peripheral device issues transaction requests directed to system physical addresses of memory. Some systems use a confidential compute architecture that restricts access to particular portions of memory to assigned entities. For example, particular portions of memory are owned by particular entities (e.g., virtual machines or a hypervisor) and those portions of memory are inaccessible to other entities. Typically these checks are performed by a memory management unit (MMU) during address translation to a system physical address. As peripheral devices are unable to perform these translations, peripheral devices are unable to perform transactions targeting system physical addresses in a confidential compute environment.

To that end, the present specification sets forth various implementations for peripheral device protocols in confidential compute architectures. In some implementations, a method of peripheral device protocols in confidential compute architectures includes: receiving a first address translation request from a peripheral device supporting a first protocol, wherein the first protocol supports cache coherency between the peripheral device and a processor cache. The method also includes determining that a confidential compute architecture is enabled; and providing, in response to the first address translation request, a response including an indication to the peripheral device to not use the first protocol.

In some implementations, providing the indication to the peripheral device causes the peripheral device to use a second protocol that does not support cache coherency. In some implementations, the first protocol includes a first Compute Express Link (CXL) protocol. In some implementations, the second protocol includes a second Compute Express Link (CXL) protocol. In some implementations, the method further includes receiving a second address translation request from the peripheral device, determining that the confidential compute architecture is disabled, and providing a response to the second address translation request allowing use of the first protocol. In some implementations, the method further includes translating an address associated with the first transaction request to a guest physical address, wherein the response further includes the guest physical address. In some implementations, the first address translation request is received via the second protocol.

The present specification also describes various implementations of a system for peripheral device protocols in confidential compute architectures. Such a system includes a peripheral device and an apparatus operatively coupled to the peripheral device. The apparatus performs steps including receiving a first address translation request from a peripheral device supporting a first protocol, wherein the first protocol supports cache coherency between the peripheral device and a processor cache. The steps also include determining that a confidential compute architecture is enabled; and providing, in response to the first address translation request, a response including an indication to the peripheral device to not use the first protocol.

In some implementations, providing the indication to the peripheral device causes the peripheral device to use a second protocol that does not support cache coherency. In some implementations, the first protocol includes a first Compute Express Link (CXL) protocol. In some implementations, the second protocol includes a second Compute Express Link (CXL) protocol. In some implementations, the steps further include receiving a second address translation request from the peripheral device, determining that the confidential compute architecture is disabled, and providing a response to the second address translation request allowing use of the first protocol. In some implementations, the steps further include translating an address associated with the first transaction request to a guest physical address, wherein the response further includes the guest physical address. In some implementations, the first address translation request is received via the second protocol.

Also described in this specification are various implementations of a computer program product for peripheral device protocols in confidential compute architectures. Such a computer program product is disposed upon a non-transitory computer readable medium and includes computer program instructions that, when executed, cause a computer system to perform steps including receiving a first address translation request from a peripheral device supporting a first protocol, wherein the first protocol supports cache coherency between the peripheral device and a processor cache. The method also includes determining that a confidential compute architecture is enabled; and providing, in response to the first address translation request, a response including an indication to the peripheral device to not use the first protocol.

In some implementations, providing the indication to the peripheral device causes the peripheral device to use a second protocol that does not support cache coherency. In some implementations, the first protocol includes a first Compute Express Link (CXL) protocol. In some implementations, the second protocol includes a second Compute Express Link (CXL) protocol. In some implementations, the steps further include receiving a second address translation request from the peripheral device, determining that the confidential compute architecture is disabled, and providing a response to the second address translation request allowing use of the first protocol. In some implementations, the steps further include translating an address associated with the first transaction request to a guest physical address, wherein the response further includes the guest physical address.

The following disclosure provides many different implementations, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows include implementations in which the first and second features are formed in direct contact, and also include implementations in which additional features be formed between the first and second features, such that the first and second features are not in direct contact. Further, spatially relative terms, such as "beneath," "below," "lower," "above," "upper," "back," "front," "top," "bottom," and the like, are used herein for ease of description to describe one element or feature's relationship to another element(s) or feature(s) as illustrated in the figures. Similarly, terms such as "front surface" and "back surface" or "top surface" and "back surface" are used herein to more easily identify various components, and identify that those components are, for example, on opposing sides of another component. The spatially relative terms are intended to encompass different orientations of the device in use or operation in addition to the orientation depicted in the figures.

Figure 1:
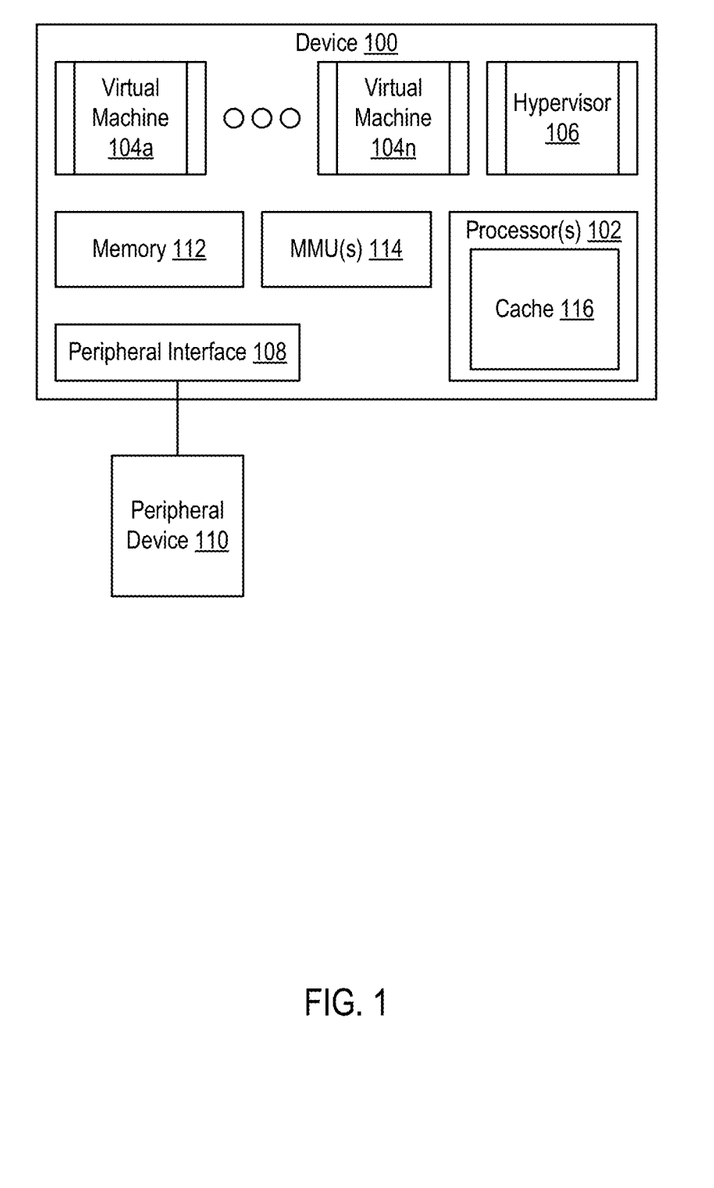
FIG. 1 is a block diagram of an example device for peripheral device protocols in confidential compute architectures according to some implementations.

FIG. 1 is a block diagram of a non-limiting example device 100. The example device 100 can be implemented as a variety of computing devices, including mobile devices, personal computers, peripheral hardware components, gaming devices, set-top boxes, and the like. One skilled in the art will appreciate that, in some implementations, the device 100 is implemented using multiple computing devices in combination. In addition to the description set forth below, the functionality of the device 100 is described in further detail in the methods described in FIGS. 3-5. The device 100 includes one or more processors 102. The processors 102 each include one or more cores of functional circuitry, such as functional circuitry fabricated on semiconductive materials. In some implementations, the processors 102 include a central processing unit (CPU). In some implementations, the processors 102 include a platform security processor 102 that performs various checks, operations, and the like associated with implementing a confidential computer architecture as will be described in further detail below. Each processor 102 includes a cache 116 (e.g., a processor cache 116). In some implementations, the cache 116 includes one or more levels of cache memory.

The device 100 executes one or more virtual machines 104a-n. Each virtual machine 104a-n is an emulated or simulated instance of a physical computing device executed within the device 100. Also executed in the device 100 is a hypervisor 106. The hypervisor 106 manages the creation, execution, and termination of virtual machines 104a-n. As an example, the hypervisor 106 manages the allocation and freeing of computational resources in the creation and termination of virtual machines 104a-n, such as memory resources, disk space, processing resources, and the like.

The device 100 also includes one or more peripheral interfaces 108. The peripheral interface 108 is a port or socket into which a peripheral device 110 is coupled in order to create an operative and communicative connection between the device 100 and the peripheral device 110. The peripheral device 110 includes any peripheral component as can be appreciated, such as network interfaces, parallel accelerators such as graphics processing units or machine learning accelerators, and the like. As an example, the peripheral interface 108 includes a peripheral component interface express (PCIe) socket.

In this example, the peripheral device 110 is capable of using a device communication protocol that allows cache coherency between the peripheral device 110 and the device 100 (e.g., between a cache of the peripheral device 110 and a memory 112 or cache 116 of the device 100). As an example, the peripheral device 110 maintains a cache corresponding to some portion of memory 112. The peripheral device 110 is able to write to the cache, and the device 100 is able to write to the cache of the peripheral device 110. Changes to the peripheral device 110 cache are able to be written back to the memory 112, written to corresponding entries in the device 100, and the like. As another example of a cache coherency operation, the peripheral device 110 performs a read-for-ownership operation which obtains the latest copy of a portion of memory from memory 112 or cache 116, while simultaneously invalidating all other cached copies of the portion of memory and making the obtained copy an exclusive copy able to be written in local cache for the peripheral device 110. In some implementations, the peripheral device 110 is able to use Compute Express Link (CXL), a standard that includes a protocol for peripheral device 110 communication that allows for such cache coherency (e.g., the CXL.cache protocol).

The peripheral device 110 is also capable of using other device communication protocols that do not provide for cache coherency. As an example, the peripheral device 110 is capable of communicating with the device 100 using PCIe. As another example, the peripheral device 110 is capable of communicating with the device using CXL.io, a CXL protocol that does not support cache coherency. In other words, the peripheral device 110 is capable of using both cache coherent and non-cache coherent protocols through a same PCIe peripheral interface 108.

The device 100 implements a confidential compute architecture. A confidential compute architecture is a technology to keep the data and memory 112 used by virtual machines 104a-n isolated from other virtual machines 104a-m, and also isolated from the hypervisor 106. Thus, data stored in a particular portion of memory 112 used by a given virtual machine 104a-n is isolated from access by other virtual machines 104a-n and the hypervisor 106. In a multitenant system where multiple tenants share the use of a same device 100 or system of devices 100 to execute their respective virtual machines 104a-n, this prevents one tenant from compromising the data of other tenants.

One approach for a confidential compute architecture is the use of secure nested paging. Particular portions of memory 112 are assigned for use by a particular virtual machine 104a-n (e.g., on a per-page basis or according to another degree of granularity). When a command or operation from a particular virtual machine 104a-n attempts to access a particular portion of memory 112, a check is performed to determine if that virtual machine 104a-n has been assigned access to that portion of memory 112. For example, a table or data structure will maintain (e.g., on a per-page basis) which system physical addresses are owned by which virtual machines 104a-n. After a command by a virtual machine 104a-n to access a particular guest virtual address of memory 112, after translation to a system physical address, a memory management unit (MMU) 114 or other portion of logic will access the data structure to determine if the virtual machine 104*a-n* has access to that system physical address. For example, a guest virtual address is first translated to a guest physical address (e.g., by the MMU 114 or by a virtualized MMU 114 implemented in the virtual machine 104*a-n*). The guest physical address is then translated by the MMU 114 to a system physical address. As used herein, a guest virtual address is a memory address in a virtual address space of a virtual machine 104*a-n*. A guest physical address is an address in the physical address space of a virtual machine 104*a-n*. A system virtual address is an address of a native virtual address space of the device 100. A system physical address is an address in the native physical address space of the device 100.

In order to maintain cache coherency (e.g., using CXL), a peripheral device 110 must use physical addresses (e.g., system physical addresses) to access the physically addressed caches 116 of the processors 102. This introduces complications when a confidential compute architecture using secure nested paging is implemented. For example, the peripheral device 110 is unable to perform the translations from a virtual address (e.g., a guest virtual address) to a system physical address in order to access the physically addressed caches 116 of the processors 102. Were the peripheral device 110 to provide a virtual address to the device 100 for translation by the MMU 114 to a system physical address, and a system physical address provided back to the peripheral device 110, it would be difficult to later invalidate the translation if necessary. As another concern, if the peripheral device 110 is malicious or compromised, the peripheral device 110 will ignore the results of address translation and emit a request for an arbitrary system physical address violating the confidential compute properties. Accordingly, there is a conflict between the use of cache coherent peripheral device protocols provided by CXL in a confidential compute architecture using secure nested paging.

Accordingly, assume that an address translation request is received from a peripheral device 110 supporting a protocol capable of cache coherency between the peripheral device 110 and processor 102 cache 116. For example, in some implementations, the address translation request is a request to translate a guest virtual address to a physical address for later access (e.g., a system physical address or guest physical address). In some implementations, the transaction request is generated by a particular virtual machine 104*a-n* accessing the peripheral device 110. As an example, the peripheral device 110 is visible or otherwise accessible to the particular virtual machine 104*a-n*. In some implementations, the address translation request includes a flag or bit that is set indicating that the peripheral device 110 is capable of supporting the cache coherent protocol. For example, in some implementations, the address translation request is provided via a non-cache coherent protocol but includes a flag or identifier indicating that the peripheral device 110 can support the cache coherent protocol.

In response to the address translation request, the device 100 determines whether a confidential compute architecture is enabled. For example, a processor 102 such as a dedicated platform security processor 102 accesses particular configuration data or other indicators as to whether the confidential compute architecture is enabled. Continuing with this example, assume that a parameter or configuration attribute is set during boot or startup of the device 100 that indicates whether the confidential compute architecture is enabled. Where enabled, the processor 102 sends a command or indication to the MMU 114 that will cause the MMU 114 to perform secure nested paging checks during address translation (e.g., from a guest physical address or guest virtual address to a system physical address).

Where the confidential compute architecture is enabled, a response to the address translation request will include an indication to the peripheral device 110 to use a second protocol that does not implement or support cache coherency instead of the first protocol that does support cache coherency. As an example, the device 100 provides, to the peripheral device 110, an indication to use PCIe or CXL.io instead of CXL.cache. In some implementations, the response includes a guest physical address corresponding to an address included in the address translation request (e.g., a guest physical address translated from a guest virtual address in the translation request). Thus, subsequent transaction requests generated by the peripheral device 110 will target the guest physical address provided in the response to the address translation request. Such subsequent transaction requests will be provided according to the second protocol (e.g., PCIe or CXL.io). Requests directed to the guest physical address will be translated by the MMU 114 into a system physical address, thereby allowing the MMU 114 to perform the secure nested paging checks against the system physical addresses.

In some implementations, in response to receiving the indication, the peripheral device 110 stores some data or other indication to use a second protocol that does not implement or support cache coherency instead of the first protocol that does support cache coherency. In some implementations, this indication is stored or maintained in volatile memory. Thus, the indication is stored so long as the peripheral device 110 maintains a connection and draws power from the device. In other implementations, this indication is stored in non-volatile memory. Accordingly, in such implementations, this indication persists across connection or disconnection events with the device 100. For example, if the peripheral device 110 is disconnected and reconnected to the device 100, the peripheral device 100 will continue to use the second protocol after reconnection to the device 100. As another example, in some implementations, the peripheral device 110 will continue to use the second protocol after connection to a different device 100 until receiving a command or instruction to use the first protocol.

One skilled in the art will appreciated that the approaches described herein allow for peripheral devices 110 able to use cache coherent protocols to still be used in a confidential compute architecture by switching to another non-cache coherent protocol. Moreover, one skilled in the art will appreciate that the approaches described herein will allow for such peripheral devices 110 to use their cache coherent protocols should the confidential compute architecture be disabled.

Although the above discussion describes restricting the use of a protocol that allows for cache coherency between the peripheral device 110 and the processor 102 cache 116, one skilled in the art will appreciate that the approaches described herein are applicable to preventing the use of any standard or protocol whereby a peripheral device 110 accesses system addressed memory using system physical addresses.

Moreover, although the above discussion describes restricting the use of a protocol that allows for cache coherency between the peripheral device 110 and the processor 102 cache 116, one skilled in the art will appreciate that in some implementations the peripheral device 110 determines whether the confidential compute architecture is enabled on the device 100. For example, in some implementations, the peripheral device 110 queries the device 100 to determine if the confidential compute architecture is enabled. As another example, in some implementations, the peripheral device 110 causes the confidential compute architecture to be enabled or disabled (e.g., by the peripheral device 110 or in response to connection by the peripheral device 110). Accordingly, in some implementations, where the confidential compute architecture is determined to be enabled, the peripheral device 110 restricts the use of the cache coherent protocol.

In some implementations, the device 100 of FIG. 1 is implemented as computer 200. The computer 200 includes least one processor 202. In addition to at least one processor 202, the computer 200 of FIG. 2 includes random access memory (RAM) 204 which is connected through a high-speed memory bus 206 and bus adapter 208 to processor 202 and to other components of the computer 200. Stored in RAM 204 is an operating system 210, virtual machines 104a-n and a hypervisor 106. The operating system 210 in the example of FIG. 2 is shown in RAM 204, but many components of such software typically are stored in non-volatile memory also, such as, for example, on data storage 212, such as a disk drive.

Figure 2:
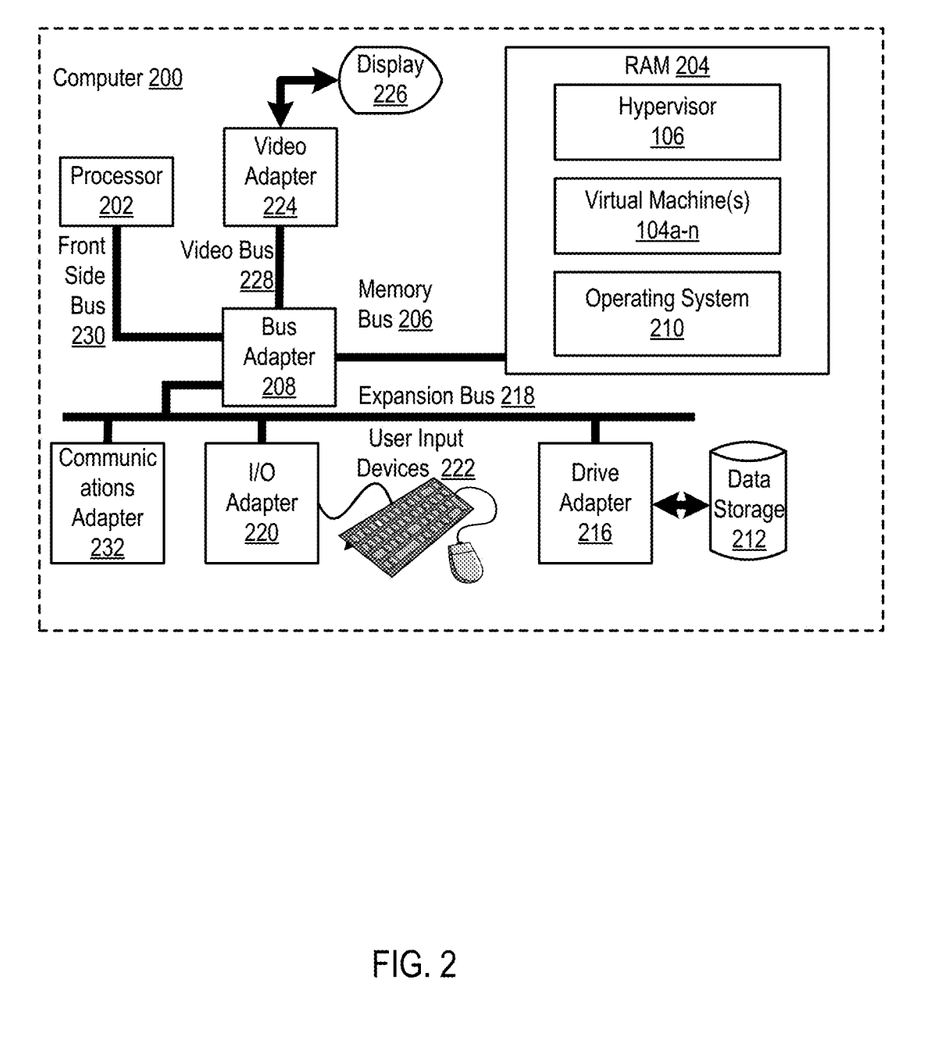
FIG. 2 is a block diagram of an example computer for peripheral device protocols in confidential compute architectures according to some implementations.

The computer 200 of FIG. 2 includes disk drive adapter 216 coupled through expansion bus 218 and bus adapter 208 to processor 202 and other components of the computer 200. Disk drive adapter 216 connects non-volatile data storage to the computer 200 in the form of data storage 212. Such disk drive adapters include Integrated Drive Electronics ('IDE') adapters, Small Computer System Interface ('SCSI') adapters, and others as will occur to those of skill in the art. In some implementations, non-volatile computer memory is implemented as an optical disk drive, electrically erasable programmable read-only memory (so-called 'EEPROM' or 'Flash' memory), RAM drives, and so on, as will occur to those of skill in the art.

The example computer 200 of FIG. 2 includes one or more input/output ('I/O') adapters 220. I/O adapters implement user-oriented input/output through, for example, software drivers and computer hardware for controlling output to display devices such as computer display screens, as well as user input from user input devices 222 such as keyboards and mice. The example computer 200 of FIG. 2 includes a video adapter 224, which is an example of an I/O adapter specially designed for graphic output to a display device 226 such as a display screen or computer monitor. Video adapter 224 is connected to processor 202 through a high-speed video bus 228, bus adapter 208, and the front side bus 230, which is also a high speed bus.

The exemplary computer 200 of FIG. 2 includes a communications adapter 232 for data communications with other computers and for data communications with a data communications network. Such data communications are carried out serially through RS-232 connections, through external buses such as a Universal Serial Bus ('USB'), through data communications networks such as IP data communications networks, and/or in other ways as will occur to those of skill in the art. Communications adapters 232 implement the hardware level of data communications through which one computer sends data communications to another computer, directly or through a data communications network. Such communication adapters 232 include modems for wired dial-up communications, Ethernet (IEEE 802.3) adapters for wired data communications, and 802.11 adapters for wireless data communications.

Figure 3:
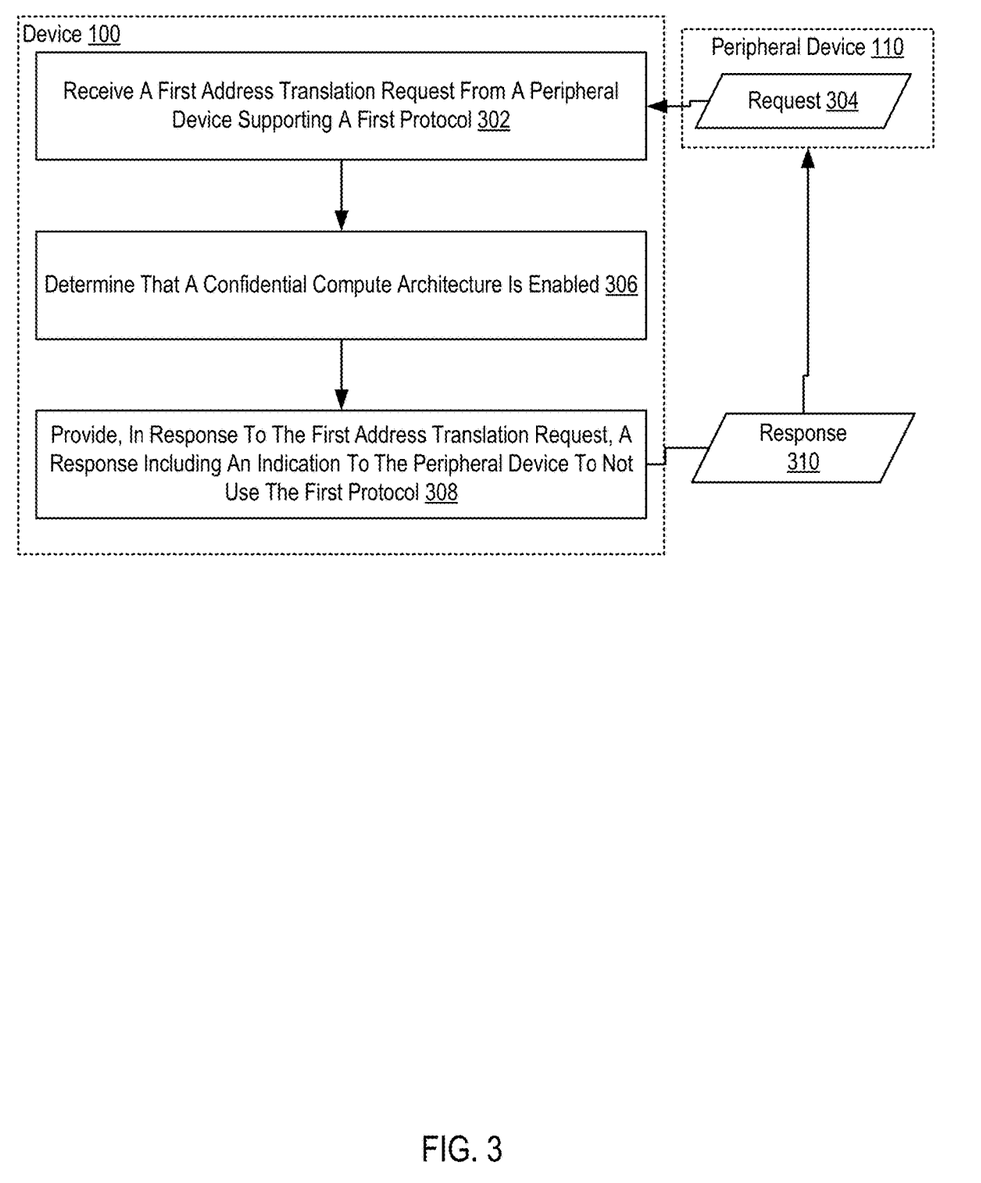
FIG. 3 is a flowchart of an example method for peripheral device protocols in confidential compute architectures according to some implementations.

For further explanation, FIG. 3 sets forth a flow chart illustrating an example method for peripheral device protocols in confidential compute architectures. The method of FIG. 3 is implemented, for example, in a device 100. The method of FIG. 3 includes receiving 302 a first address translation request (e.g., a request 304) from a peripheral device 110 supporting a first protocol. The first protocol supports cache coherency between the peripheral device 100 and a processor 102 cache 116. The first protocol supports cache coherency between the peripheral device 100 and the processor 102 cache 116 in that the device 100 has access to read and write from cache on the peripheral device 100, and portions of both the peripheral device 110 cache and the processor 102 cache 116 each correspond to portions of the device 100 memory 112. As an example, the first protocol includes a Compute Express Link (CXL) protocol such as CXL.cache.

In some implementations, the request 304 is associated with a particular virtual machine 104a-n. For example, the request 304 is generated by the peripheral device 110 in response to a command or operation from a virtual machine 104a-n having access to the peripheral device 110. In some implementations, the request 304 includes a request to translate a virtual address (e.g., a guest virtual address) to a physical address (e.g., a system physical address). For example, as the peripheral device 110 uses system physical addresses to target physically addressed portions of cache 116 to maintain cache coherency, the peripheral device 110 will request a translation of the virtual address to the system physical address to perform subsequent transactions.

The method of FIG. 3 also includes determining 306 that a confidential compute architecture is enabled. The confidential compute architecture is an operative technique that isolates portions of memory 112 used by particular virtual machines 104a-n from other virtual machines 104a-n in the hypervisor. As an example, the confidential compute architecture includes using secure nested paging whereby particular portions (e.g., pages) of system physically addressed memory 112 are assigned to or owned by particular virtual machines 104a-n. A data structure maintaining associations between virtual machines 104a-n and pages of memory 112 is accessed (e.g., by an MMU 114) during address translations to system physical addresses. For example, a guest virtual address provided for translation is translated to a guest physical address and then to a system physical address. As another example, a guest physical address provided for translation (e.g., translated from a guest virtual address by a virtualized MMU 114 in a virtual machine 104a-n) is provided to the MMU 114 for translation to a system physical address. The system physical address is then used to query a data structure or table to identify the entity, if any, that owns or has access to the system physical addressed portion memory 112.

In some implementations, determining 306 that the confidential compute architecture is enabled includes determining whether a particular configuration parameter or setting (e.g., in the MMU 114, in the hypervisor 106, in an operating system, and the like) is set to indicate that the confidential compute architecture is enabled.

The method of FIG. 3 also includes providing 308, in response to the first address translation request (e.g., the request 304), a response 310 including an indication to the peripheral device 110 to not use the first protocol. In some implementations, the response 310 indicates another protocol to use instead of the first protocol. For example, the other protocol includes a protocol that does not support cache coherency between the peripheral device 110 and the processor 102 cache 116 such as PCIe or CXL.io. In some implementations, the response 310 does not indicate another protocol. Accordingly, the peripheral device 110 will determine another supported protocol to use instead of the first protocol. In some implementations, the request 304 is received via the second protocol. In some implementations, the response 310 is provided via the second protocol.

In some implementations, the response 310 includes a guest physical address corresponding to a guest virtual address included in the request 304. For example, where the request 304 includes a translation request for a guest virtual address, the response 310 includes a guest physical address corresponding to the guest virtual address. In other words, instead of providing a system physical address in response to the request 304, a guest physical address is provided to the peripheral device 110. Thus, the peripheral device 110 is able to use the guest physical address as a target for subsequent transactions or memory operations. Such guest physical addresses are then translated by the MMU 114 into system physical addresses for subsequent secure nested paging checks.

Figure 4:
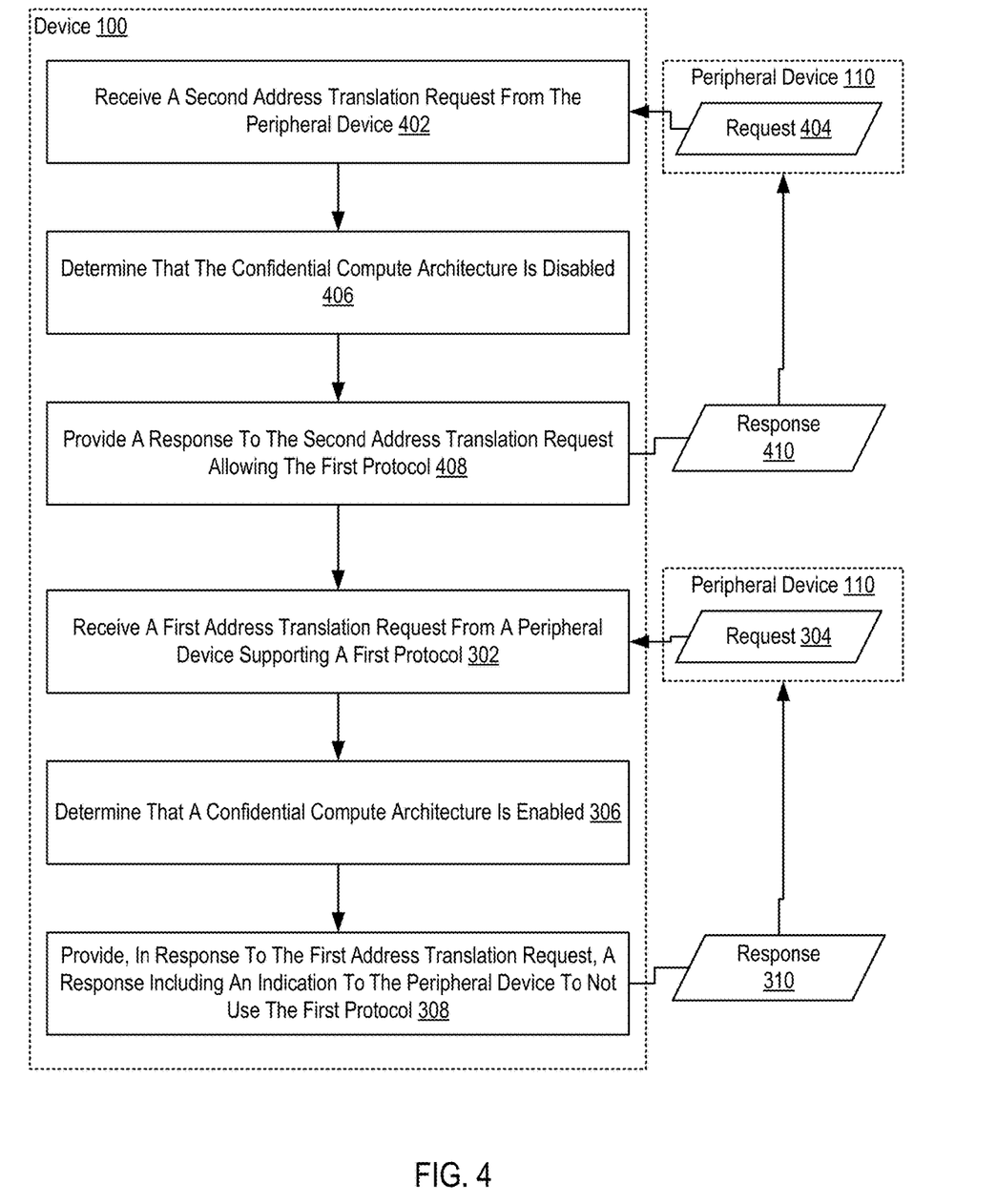
FIG. 4 is a flowchart of another example method for peripheral device protocols in confidential compute architectures according to some implementations.
Figure 5:
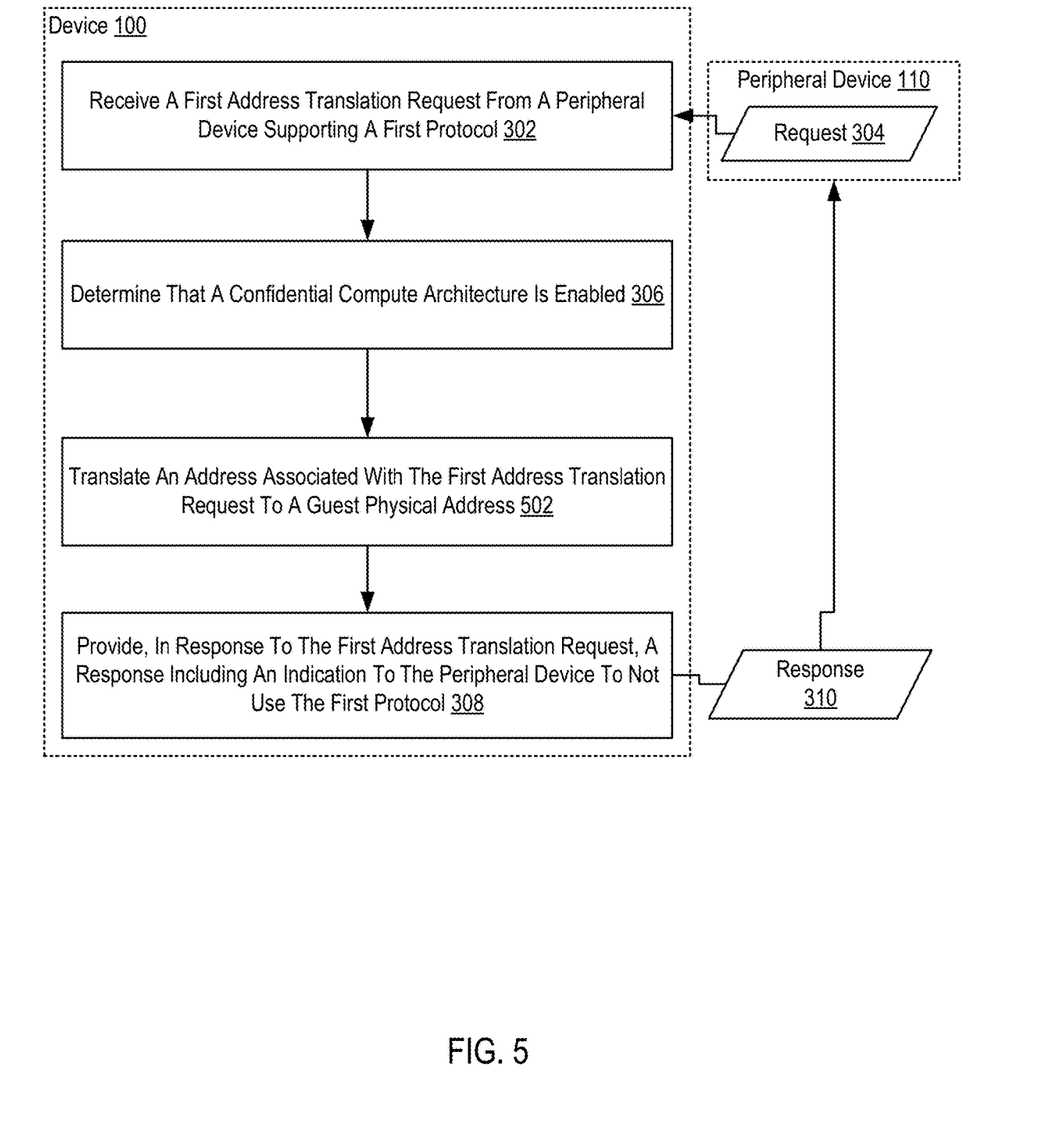
FIG. 5 is a flowchart of another example method for peripheral device protocols in confidential compute architectures according to some implementations.

The approaches described for peripheral device protocols in confidential compute architectures with respect to FIG. 1 are also described as methods in the flowcharts of FIGS. 3-5. Accordingly, for further explanation, FIG. 4 sets forth a flow chart illustrating an example method for peripheral device protocols in confidential compute architectures. The method of FIG. 4 is similar to FIG. 3 in that the method of FIG. 4 also includes receiving 302 a first address translation request (e.g., a request 304) from a peripheral device 110 supporting a first protocol, determining 306 that a confidential compute architecture is enabled, and providing 308, in response to the first address translation request (e.g., the request 304), a response 310 including an indication to the peripheral device 110 to not use the first protocol.

In some implementations, the device 100 enables the confidential compute architecture consistently by default. In some implementations, the device 100 transitions between implementing and not implementing the confidential compute architecture. For example, in some implementations, the confidential compute architecture is enabled by a user or other entity after being disabled. As another example, the peripheral device 110 causes the device 100 to enable or disable the confidential compute architecture (e.g., in response to connection to the device 100, in response to a command or signal from the peripheral device 110 to the device, and the like).

Accordingly, the method of FIG. 4 is different from FIG. 3 in that the method of FIG. 4 also includes receiving 402 a second address translation request (e.g., a request 404) from the peripheral device 110 and determining 406 that the confidential compute architecture is disabled. For example, assume that the second request 404 is received before the first request 304. Further assume that, at the time the second request 404 was received, the confidential compute architecture had not been enabled.

The method of FIG. 4 also includes providing 408 a response 410 to the second address translation request (e.g., the request 404) allowing first protocol (e.g., the cache coherent protocol). In response to the second request 404, an address translation operation is performed. For example, in some implementations, a translation from a virtual address to a system physical address is performed. The response 410 then includes the system physical address. As the confidential compute architecture is disabled, the peripheral device 110 is able to use the system physical address to perform operations to maintain cache coherency between the processor 102 cache 116 and the peripheral device 110. In some implementations, the response 410 will include a flag, bit, or other operand indicating that the first protocol (e.g., the cache coherent protocol) is able to be used for subsequent transactions targeting the system physical address included in the response 410.

Although FIG. 4 depicts steps 402-408 being performed before step 302, whereby a confidential compute architecture is enabled after being disabled, in some implementations the steps 402-408 are performed after step 308, whereby a confidential compute architecture is disabled after being enabled. Moreover, although FIG. 4 describes a same peripheral device 110 as was described in FIG. 3, in some implementations the peripheral devices 110 shown in FIG. 4 are different peripheral devices 110. As an example, the confidential compute architecture of the device 100 is enabled or disabled depending on which peripheral device 110 is attached.

One skilled in the art will appreciate that the method of FIG. 4 illustrates that a peripheral device 110 is able to use a cache coherent protocol while the confidential compute architecture is disabled. On enablement of the confidential compute architecture, the peripheral device 110 is still usable via another protocol and does not need to be removed from the device 100. One skilled in the art will also appreciate that if the confidential compute architecture is disabled after being enabled, in some implementations, the peripheral device 110 is able to instead use the first protocol to process subsequent requests.

For further explanation, FIG. 5 sets forth a flow chart illustrating an example method for peripheral device protocols in confidential compute architectures. The method of FIG. 5 is similar to FIG. 3 in that the method of FIG. 5 also includes receiving 302 a first address translation request (e.g., a request 304) from a peripheral device 110 supporting a first protocol, determining 306 that a confidential compute architecture is enabled, and providing 308, in response to the first address translation request (e.g., the request 304), a response including an indication to the peripheral device 110 to not use the first protocol.

The method of FIG. 5 is different from FIG. 3 in that the method of FIG. 5 also includes translating 502 an address associated with the first address translation request (e.g., the request 304) to a guest physical address. In some implementations, the guest physical address is translated from a guest virtual address included in the request 304. As an example, the guest virtual address is translated to the guest physical address by the MMU 114 or a virtualized MMU 114 in a virtual machine 104a-n. The translated guest physical address is then included in the response 310 to the request 304.

As an example, in some implementations, the first address translation request is a request to translate a guest virtual address to a system physical address. Due to the confidential compute architecture being enabled, the peripheral device 110 does not have access to certain areas of memory. In order to control access to these areas, the device 100 requires that memory accesses being used by peripheral device 110 to be directed to guest physical addresses. These guest physical addresses are then used by the device 100 to determine if the peripheral device 100 has access under the confidential compute architecture. Accordingly, the response to the first address translation request includes a guest physical address instead of the requested system physical address.

In view of the explanations set forth above, readers will recognize that the benefits of peripheral device protocols in confidential compute architectures include performance of a computing system by allowing the use of peripheral devices capable of cache coherent device protocols in a system implementing a confidential compute architecture.

Exemplary implementations of the present disclosure are described largely in the context of a fully functional computer system for peripheral device protocols in confidential compute architectures. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary implementations described in this specification are oriented to software installed and executing on computer hardware, nevertheless, alternative implementations implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some implementations, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various implementations of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various implementations of the present disclosure. The descriptions in this specification are for purposes of illustration only and are not to be construed in a limiting sense. The scope of the present disclosure is limited only by the language of the following claims.

What is claimed is:

1. A method of peripheral device protocols in confidential compute architectures, the method comprising:
providing, in response to a first address translation request received from a peripheral device supporting a first protocol, and based on a confidential compute architecture being enabled, a response comprising an indication to the peripheral device to not use the first protocol, wherein the first protocol supports cache coherency between the peripheral device and a processor cache.

2. The method of claim 1, wherein the indication to the peripheral device causes the peripheral device to use a second protocol that does not support cache coherency.

3. The method of claim 2, wherein the first protocol comprises a first Compute Express Link (CXL) protocol.

4. The method of claim 3, wherein the second protocol comprises a second CXL protocol.

5. The method of claim 1, further comprising:
receiving a second address translation request from the peripheral device; and
providing, based on the confidential compute architecture being disabled, a response to the second address translation request allowing the use of the first protocol.

6. The method of claim 1, further comprising:
translating an address associated with the first address translation request to a guest physical address; and
wherein the response further comprises the guest physical address.

7. The method of claim 2, wherein the first address translation request is received via the second protocol.

8. A system for peripheral device protocols in confidential compute architectures comprising:
a peripheral device; and
an apparatus operatively coupled to the peripheral device, the apparatus comprising a computer processor configured to:
provide, in response to a first address translation request received from a peripheral device supporting a first protocol, and based on a confidential compute architecture being enabled, a response comprising an indication to the peripheral device to not use the first protocol, wherein the first protocol supports cache coherency between the peripheral device and a processor cache.

9. The system of claim 8, wherein the indication to the peripheral device causes the peripheral device to use a second protocol that does not support cache coherency.

10. The system of claim 9, wherein the first protocol comprises a first Compute Express Link (CXL) protocol.

11. The system of claim 10, wherein the second protocol comprises a second CXL protocol.

12. The system of claim 8, wherein the computer processor is further configured to:
receive a second address translation request from the peripheral device; and
provide, based on the confidential compute architecture being disabled, a response to the second address translation request allowing the use of the first protocol.

13. The system of claim 8, wherein the computer processor is further configured to:
translate an address associated with the first address translation request to a guest physical address; and
wherein the response further comprises the guest physical address.

14. The system of claim 9, wherein the first address translation request is received via the second protocol.

15. A computer program product disposed upon a non-transitory computer readable medium, the computer program product comprising computer program instructions for peripheral device protocols in confidential compute architectures that, when executed, cause a computer system to:
provide, in response to a first address translation request received from a peripheral device supporting a first protocol, and based on a confidential compute architecture being enabled, a response comprising an indication to the peripheral device to not use the first protocol, wherein the first protocol supports cache coherency between the peripheral device and a processor cache.

16. The computer program product of claim 15, wherein the indication to the peripheral device causes the peripheral device to use a second protocol that does not support cache coherency.

17. The computer program product of claim 16, wherein the first protocol comprises a first Compute Express Link (CXL) protocol.

18. The computer program product of claim 17, wherein the second protocol comprises a second CXL protocol.

19. The computer program product of claim 15, wherein the computer processor is further configured to:
receive a second address translation request from the peripheral device; and
provide, based on the confidential compute architecture being disabled, a response to the second address translation request allowing the use of the first protocol.

20. The computer program product of claim 15, wherein the computer processor is further configured to:
translate an address associated with the first address translation request to a guest physical address; and wherein the response further comprises the guest physical address.

\* \* \* \* \*